(12) United States Patent
McKinley et al.

(10) Patent No.: US 11,590,587 B2
(45) Date of Patent: Feb. 28, 2023

(54) DRILL SYSTEMS WITH COOLANT DELIVERY ARRANGEMENTS AND METHODS

(71) Applicant: Allied Machine & Engineering Corporation, Dover, OH (US)

(72) Inventors: Robert E. McKinley, Hudson, OH (US); Richard D. Polilli, III, New Philadelphia, OH (US); Logan J. Lamonica, Dover, OH (US)

(73) Assignee: ALLIED MACHINE & ENGINEERING CORPORATION, Dover, OH (US)

( * ) Notice: Subject to any disclaimer, the term of this patent is extended or adjusted under 35 U.S.C. 154(b) by 196 days.

(21) Appl. No.: 16/850,684

(22) Filed: Apr. 16, 2020

(65) Prior Publication Data
US 2021/0323080 A1    Oct. 21, 2021

(51) Int. Cl.
*B23B 51/06*    (2006.01)
(52) U.S. Cl.
CPC ...... *B23B 51/06* (2013.01); *B23B 2200/0457* (2013.01); *B23B 2200/086* (2013.01);
(Continued)

(58) Field of Classification Search
CPC ............ B23B 51/06; B23B 2200/0457; B23B 2200/086; B23B 2200/3618;
(Continued)

(56) References Cited

U.S. PATENT DOCUMENTS

| 3,076,357 A | 2/1963 | Benjamin et al. |
| 3,364,800 A | 1/1968 | Benjamin et al. |

(Continued)

FOREIGN PATENT DOCUMENTS

| DE | 10016464 | 10/2001 |
| FR | 3074435 | 6/2019 |

(Continued)

OTHER PUBLICATIONS

International Search Report and Written Opinion for PCT/US21/26812 dated Jul. 26, 2021.

*Primary Examiner* — Eric A. Gates
(74) *Attorney, Agent, or Firm* — Hahn Loeser + Parks LLP; Scott M. Oldham (57) ABSTRACT

There is provided a drill tool assembly for drilling metallic or other materials, comprising a holder having a mounting slot in which a cutting insert is positioned, and a through tool coolant supply system. The drilling tool system allows for the application of coolant to the rake surfaces of the cutting insert in a manner which facilitates enabling higher penetration rates while maintaining integrity of the cutting edges of the cutting insert. The drilling tool system comprises a holder having a rotational axis and mounting slot. A cutting insert with sides positioned adjacent the side surfaces of the mounting slot and cutting edges extending from the rotational axis is mounted in the slot. The insert includes rake surfaces adjacent the cutting edges that are positioned above the mounting slot. At least one coolant channel is disposed with at least one coolant outlet directed at the sides of the insert at a position below the rake surfaces. The coolant outlet is configured to disperse coolant in a curtain across the entire rake face of each cutting edge.

34 Claims, 10 Drawing Sheets

(52) U.S. Cl.
CPC ... *B23B 2200/3618* (2013.01); *B23B 2231/24* (2013.01); *B23B 2250/12* (2013.01); *B23B 2251/02* (2013.01)

(58) Field of Classification Search
CPC ............ B23B 2231/24; B23B 2250/12; B23B 2251/02; B23B 2200/128; B23B 2205/12; B23B 2251/50; B23B 27/10; B23B 51/0486; B23B 51/0493; B23C 5/28; B23C 2250/12
See application file for complete search history.

(56) References Cited

U.S. PATENT DOCUMENTS

| | | | |
|---|---|---|---|
| 4,621,547 A | 11/1986 | Yankoff | |
| 4,791,840 A | 12/1988 | De Rosier et al. | |
| 5,237,894 A | 8/1993 | Lindeke | |
| 5,439,327 A | 8/1995 | Wertheim | |
| 5,775,854 A | 7/1998 | Wertheim | |
| 5,865,574 A | 2/1999 | Tukala | |
| 6,045,301 A | 4/2000 | Kammermeier et al. | |
| 6,116,825 A | 9/2000 | Kammermeier et al. | |
| 6,302,004 B1 | 10/2001 | Taylor | |
| 6,447,222 B2 | 9/2002 | Kojima | |
| 6,652,200 B2 | 11/2003 | Kraemer | |
| 7,083,367 B2 | 8/2006 | Deleft | |
| 7,625,157 B2 | 12/2009 | Prichard et al. | |
| 7,955,032 B2 | 6/2011 | Nelson | |
| 8,047,748 B2 | 11/2011 | Endres | |
| 8,701,529 B2 | 4/2014 | Deschenaux et al. | |
| 8,753,046 B2 | 6/2014 | Schneider et al. | |
| 8,827,599 B2 | 9/2014 | Henry et al. | |
| 9,095,913 B2 | 8/2015 | Chen et al. | |
| 9,101,985 B2 | 8/2015 | Chen et al. | |
| 9,168,588 B2 | 10/2015 | Kaufmann et al. | |
| 9,346,103 B2 | 5/2016 | Luik et al. | |
| 9,387,537 B2 | 7/2016 | Hoffer et al. | |
| 9,427,807 B2 | 8/2016 | Flolo | |
| 9,579,727 B2 | 2/2017 | Kaufmann et al. | |
| 9,586,263 B2 | 3/2017 | Frota de Souza Filho et al. | |
| 9,925,596 B2 | 3/2018 | Johansson et al. | |
| 9,931,699 B2 | 4/2018 | Kitagawa | |
| 10,421,135 B2 | 9/2019 | Mueller et al. | |
| 10,537,943 B2 | 1/2020 | Jager | |
| 2005/0084343 A1 | 4/2005 | Deleft | |
| 2008/0175679 A1 | 7/2008 | Prichard et al. | |
| 2010/0172704 A1 | 7/2010 | Nelson | |
| 2011/0020073 A1 | 1/2011 | Chen et al. | |
| 2014/0147219 A1 | 5/2014 | Kaufmann et al. | |
| 2015/0063926 A1 | 3/2015 | Wu et al. | |
| 2015/0343534 A1 | 12/2015 | Kaufmann et al. | |
| 2016/0067785 A1 | 3/2016 | Wang et al. | |
| 2019/0143423 A1 | 5/2019 | Nakata et al. | |

FOREIGN PATENT DOCUMENTS

| | | |
|---|---|---|
| WO | 2018162185 | 9/2018 |
| WO | 2019017064 | 1/2019 |

DRILL SYSTEMS WITH COOLANT DELIVERY ARRANGEMENTS AND METHODS

TECHNICAL FIELD

The present invention relates to a drill tool assembly for drilling metallic or other materials, comprising a holder having a mounting slot in which a cutting insert is positioned, and a through tool coolant supply system. More specifically, this invention relates to a drilling tool system that allows for the application of coolant to the rake face of the cutting insert in a manner which facilitates enabling higher penetration rates while maintaining integrity of the cutting edges of the cutting insert.

BACKGROUND OF THE INVENTION

In the metal cutting industry, it is highly desired to make use of coolant to achieve better tool performance. Using coolant provides lubricity, heat dissipation from the tool, and aids in chip evacuation. This results in a tool that can operate faster and achieve longer tool life. Though the use of coolant in drilling products to various industries is typical, a need still exists in the drilling tool industry for a coolant delivery method that excels at targeting the interface of the chip and rake face of the cutting geometry, particularly in drilling tools with two effective cutting edges. The delivery of coolant in such tools has not allowed for higher penetration rates to be achieved in the drilling operation, without sacrifice of tool life. Achieving this is even more critical because the properties of many materials being drilled today create undesirable heat, friction, and adhesion to the rake face of drilling tools of this type, which negatively affect drill performance. These undesirable effects are amplified by the increasing desire to drill holes faster in high production environments. It is therefore clear that there is a significant need for coolant delivery in a manner which excels at reducing heat, friction, and adhesion on the rake face during the drilling operation, allowing for enhanced performance at speeds elevated over similar drill designs.

SUMMARY OF THE INVENTION

The invention is therefore directed to a drilling tool which achieves the beneficial effects of minimizing undesirable heat, friction, and adhesion to the rake face of drilling tools of this type. The drilling tool system comprises a holder having a rotational axis and first and second clamp arms with side surfaces forming a mounting slot. A cutting insert with sides positioned adjacent the side surfaces of the mounting slot and cutting edges extending from the rotational axis is mounted in the slot. The insert includes rake surfaces adjacent the cutting edges that are positioned above the first and second clamp arms when the insert is mounted in the mounting slot. At least one coolant channel is disposed through the first and second clamp arms with at least one coolant outlet directed at the sides of the insert at a position below the rake surfaces. The coolant outlet is configured to disperse coolant in a curtain across the entire rake face of each cutting edge.

A drill tool assembly according to an example comprises a holder having first and second ends and a rotational axis. The second end of the holder is configured to be fixedly attached in a drilling machine, and the first end comprises a holder slot having a bottom seating surface over at least a portion of the holder slot. At least one cutting insert having first and second sides is provided, with the first side positioned in the holder slot in seating engagement with the bottom seating surface of the holder, such that the insert has a common rotational axis with the holder. The second side of the insert includes first and second double effective cutting edges extending from the rotational axis, and first and second rake faces adjacent the cutting edges. The holder further includes at least first and second coolant holes extending through the holder and directing an amount of coolant onto the first and second rake faces at a predetermined location and volume of coolant to spread out on the first and second rake faces over substantially the entire portion of the rake face adjacent each cutting edge.

In an example, the drill tool assembly comprises at least first and second coolant holes extending through the holder and having an exit opening at least partially in the holder slot and angled to direct an amount of coolant onto the first and second rake faces at a predetermined location adjacent the holder slot and at an angle to the rake face. In an example, the drill tool assembly comprises at least first and second coolant holes extending through the holder and having an exit opening in the holder slot and into at least one reservoir adjacent the rake face and direct an amount of coolant onto the first and second rake faces at a predetermined location from the at least one reservoir.

The invention also provides a method of delivering coolant in a drilling operation using a drilling tool comprising a holder having first and second ends and a rotational axis. The second end of the holder is configured to be fixedly attached in a drilling machine, and the first end of the holder comprising a mounting slot with side surfaces and a cutting insert positioned in the mounting slot with side surfaces positioned adjacent the side surfaces of the mounting slot, and wherein the insert includes first and second double effective cutting edges extending from the rotational axis, and first and second rake faces adjacent the cutting edges and above the mounting slot of the holder, and wherein the holder further includes at least first and second coolant outlets positioned adjacent the sides of the insert, and directing an amount of coolant under pressure onto the side surfaces of the insert to cause the dispersal of coolant in a curtain over substantially the entire portion of the rake surface adjacent each cutting edge.

The coolant supply arrangement provides a constant directed coolant spray across the rake face of the cutting geometry, particularly across the rake face of a double effective cutting edge arrangement. Typical drill designs do not target this critical cutting zone with directed coolant, and instead rely on a flooding effect of coolant to attempt to reach this area. Additionally, the coolant delivery system in the drilling tool of the invention aids in chip segmentation, through thermal shocking of the chip at the rake face provided by the directed coolant. The targeted coolant also improves lubricity and coolant flow around the cutting area, minimizing re-cutting of chips and promoting superior chip evacuation from the drilled hole. It is also important to note that this coolant delivery system and method can be used in conjunction with additional coolant outlets that are targeting other critical areas of the cutting action within the same drill body. Such additional coolant supply may depend on various factors and depend on the application and material.

Accordingly, this invention provides an improved drill tool assembly and method to enable minimization of undesirable heat, friction, and adhesion to the rake face of material during a drilling operation, resulting in the ability to operate the drilling tool at higher speeds while providing exceptional tool life.

The above improvements and advantages along with other objects and advantages of the present invention will become readily apparent from a reading of the detailed description of various examples taken in conjunction with the drawings and the claims.

BRIEF DESCRIPTION OF THE DRAWINGS

The invention and characteristics thereof are described in more detail in the following by way of examples with reference to the drawings, in which.

DESCRIPTION OF THE INVENTION

Turning now to examples of the invention, it will be noted that the coolant supply configurations provide distinct advantages in association with drilling tools used for hole making. Known coolant configurations for drills may include through coolant drills that are designed with coolant exiting on the clearance surface of the cutting geometry of the drill. This results in the coolant being directed into the bottom of the drilled hole. Other arrangements include coolant outlets exiting in the drill flute and aimed at the bottom of the hole. Such arrangements have a higher potential to disrupt chip flow through the drill flutes, and coolant is directed toward the bottom of the hole from a distance away from the cutting end of the drill. In the examples of the invention, the arrangement of coolant supply creates a superior coolant trajectory that better targets the entire rake face of the cutting geometry without disrupting chip flow. The examples are directed to improved coolant delivery systems and methods to enhance drilling performance.

Figure 1:
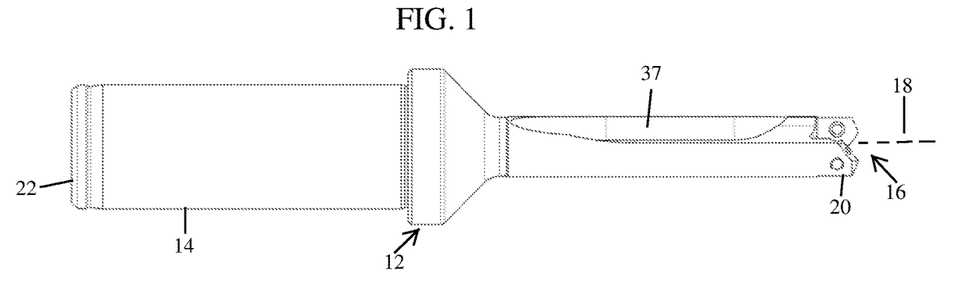
FIG. 1 is a view of the drill tool holder body in an example.
Figure 2:
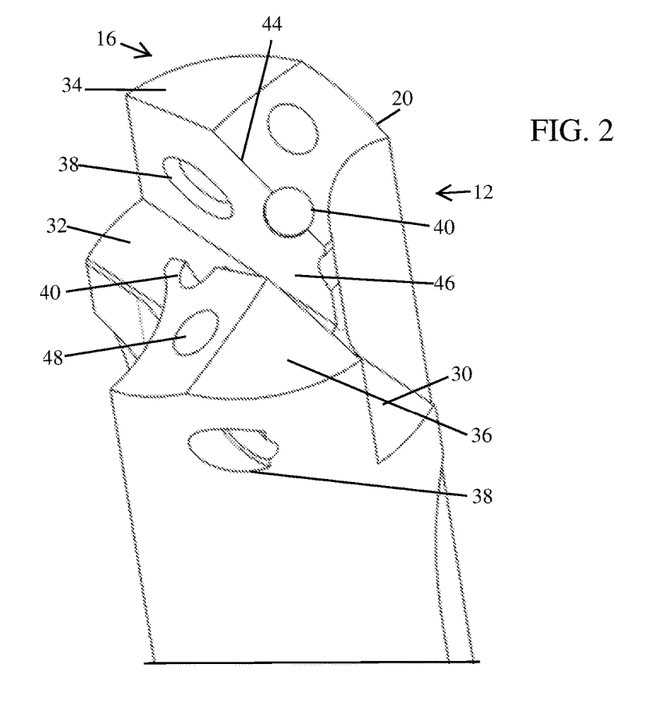
FIG. 2 is a partial perspective view of the holder shown in FIG. 1.

Turning to FIGS. 1-5, there is illustrated a first example of a drill tool assembly generally indicated at 10. Drill tool assembly 10 comprises a holder 12, which has a shank 14 and head portion 16 associated therewith. The holder 12 has in general a cylindrical shape with a first end 20 and second end 22 with the second end 22 and portion of shank 14 adapted to be fixedly attached in a drilling machine for use. As shown in FIG. 2, the first end 20 of holder 12 has a clamping or locating slot 30 which may extend across the entire diameter of the head portion 16 or at least over a center portion thereof at the general location of the rotational axis of holder 12. The locating slot 30 has a bottom wall 32 positioned in substantially perpendicular orientation relative to the rotational axis 18 of the holder 12, or this wall 32 may be angled or comprised of multiple surfaces. Within the locating slot 30, at least one cutting insert 50 is precisely positioned with respect to the holder 12 and mates with wall 32. The cutting insert 50 performs the desired drilling function in conjunction with the holder 12, and allows replacement of the insert 50 when worn. The insert 50 has a double effective cutting geometry with a point geometry comprising a plurality of cutting edges 56 which are precisely positioned with respect to the rotational axis of the holder 12 to minimize errors in a resulting drilling operation using assembly 10.

Figure 3:
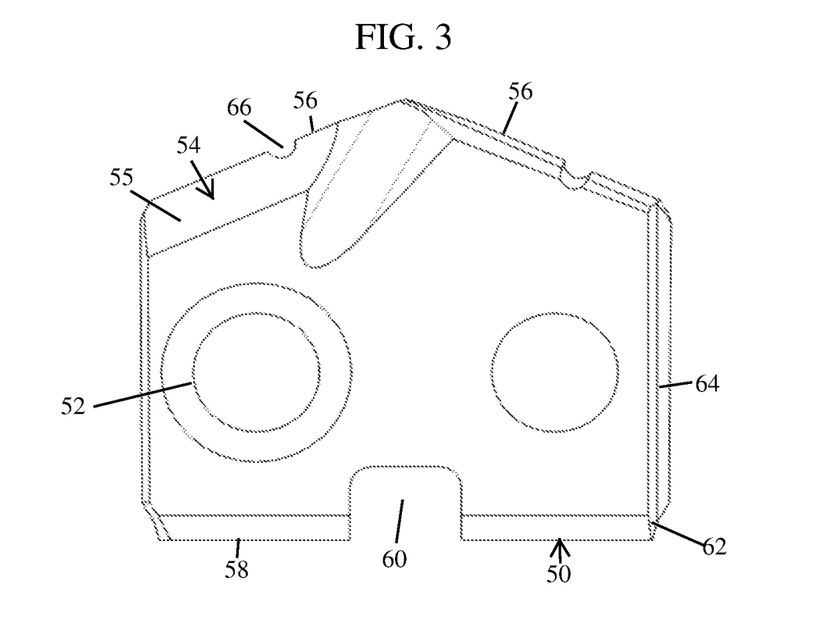
FIG. 3 is a view of cutting insert to be mounted in the holder of FIG. 1 in the drill tool assembly.

The holder 12 may be configured to include at its first end 20 a pair of clamping arms 34 and 36 which extend about locating slot 30. The clamping arms 34 and 36 include apertures 38 which accommodate screws to secure the cutting insert 50 in its position within the locating slot 30. The holes 38 are threaded, and mate with screw holes 52 formed in the cutting insert 50 to precisely locate the cutting insert 50 in a predetermined location within locating slot 30. Each of the clamp arms 34 and 36 also include first and second rake surface coolant supply vents 40, which are positioned to at least partially overlap the top edge 44 of the upstanding wall 46 of each clamp arm 34 and 36 adjacent the position of the side of the insert 50 below the rake surface 54 associated with each cutting edge 56 in cutting insert 50. A cutting lip 55 formed adjacent the cutting edge 56 provides a geometry capable of producing a curled metal chip for evacuation. The size and shape of the chip may be controlled by altering the geometry of the cutting lip 55, such as position, size and configuration. The rake surface 54 may be formed to have a planar, concave or curved surface and forms the rake angle of rake face 54 at the cutting edges 56, which may be uniform or varying. A notch formed adjacent the rotational axis provides a notch cutting edge and rake surface adjacent the insert tip. The clamp arms 34 and 36 may also include angled or curved surfaces which facilitate chip removal via chip evacuating grooves 37 on each side of the holder 12, corresponding to one of the cutting edges 56. The bottom surface 58 of the cutting insert 50 mates with seating surface 32, and although shown to be planar like surface 32, could be of another configuration corresponding to the shape of bottom surface 32. A locating boss or dowel pin (not shown) may be inserted within an aperture formed in the bottom surface 32 of locating slot 30 in holder 12, which is precisely positioned with respect to the rotational axis of the holder 12. The cutting insert 50 includes a locating slot 60 that mates with the locating boss to precisely position the insert 50 with respect to the rotational axis of the holder 12.

The cutting insert 50 may be in the form a spade drill blade, with side edges 62 of the blade being generally parallel with the rotational axis 18 of the holder 12 once the insert 50 is positioned and secured with holder 12. When secured with holder 12, cutting insert 50 will have a rotational axis which desirably is coaxial with the rotational axis of holder 12. The cutting insert 50 has a width, and may include margins 64 on edges 62 to facilitate machining of the hole with desired finish characteristics. The cutting edges 56 on cutting insert 50 are in the form of an obtuse V-shape, with cutting edges 56 on each side of the axial center. The cutting edges 56 may include a plurality of cutting sections, and chip breakers 66, which cooperate to provide the desired double effective cutting surface for the material and/or drilling application. In general, the insert 50 is designed to cut when rotationally driven in conjunction with holder 12 in a predetermined direction, and is not reversible, although such drilling blade configurations are known to those skilled in the art and could be used in conjunction with the present invention if desired. The mounting apertures 52 which cooperate with the apertures 38 in clamp arms 34 and 36 to secure insert 50 within locating slot 30 and seated against seating surface 32. The locating slot 60 allows positioning of a locating pin therein, and attachment screws (not shown) bias the insert 50 and slot 60 against a locating pin for correct and precise positioning of the insert 50 with respect to holder 12 as desired. Other arrangements to suitably locate the insert 50 with respect to the holder are contemplated. In this example, the cutting edges 56 are substantially parallel to the thickness of insert 50 and sit down from the thickness of insert 50 an amount, such as about 0.01 to 0.025 inches for example. The dispersion of coolant from coolant holes 40 allows for coolant to impinge the fusion interface of the chip being formed at and just away from rake face 54.

Figure 5:
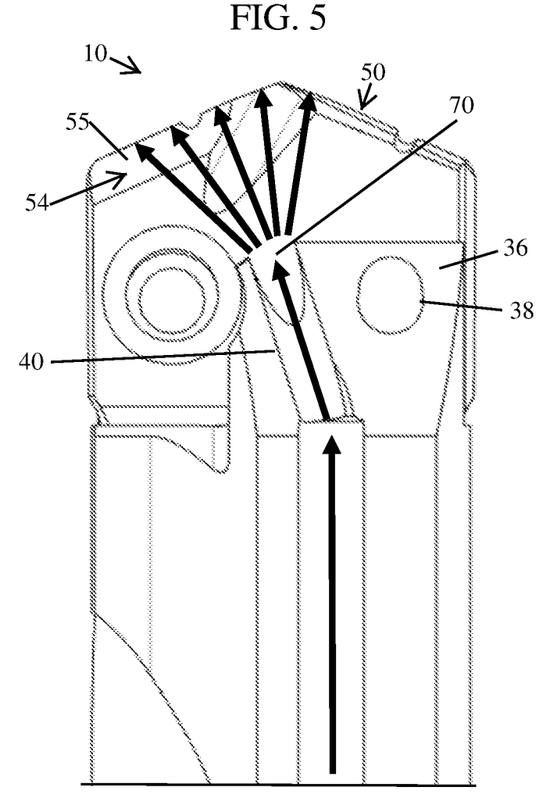
FIG. 5 is a partial sectional view of the holder shown in FIG. 1, with the insert of FIG. 2 mounted in association with the holder.
Figure 6:
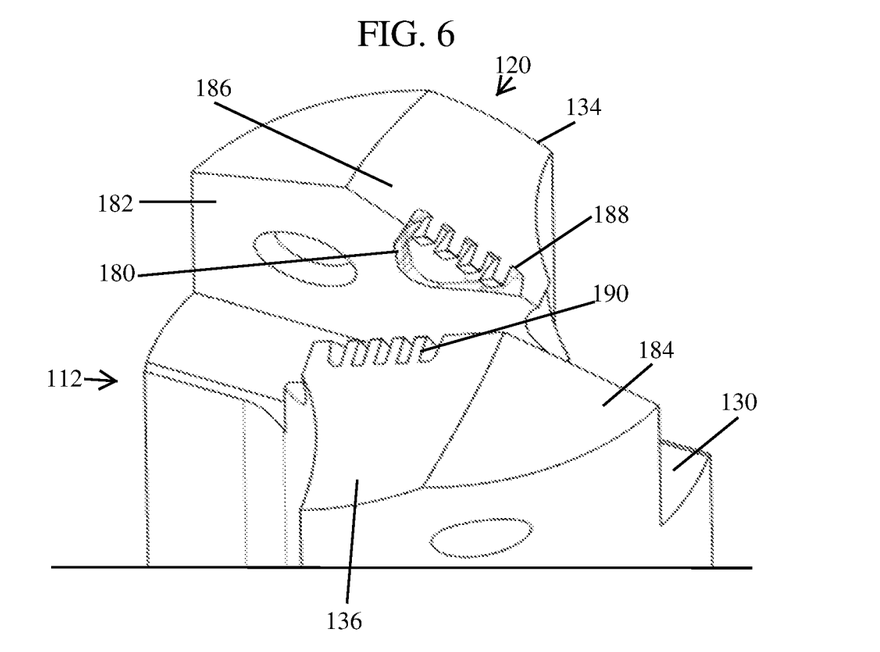
FIG. 6 is a partial perspective view of an alternative example of a holder in the drilling tool assembly of the invention.
Figure 7:
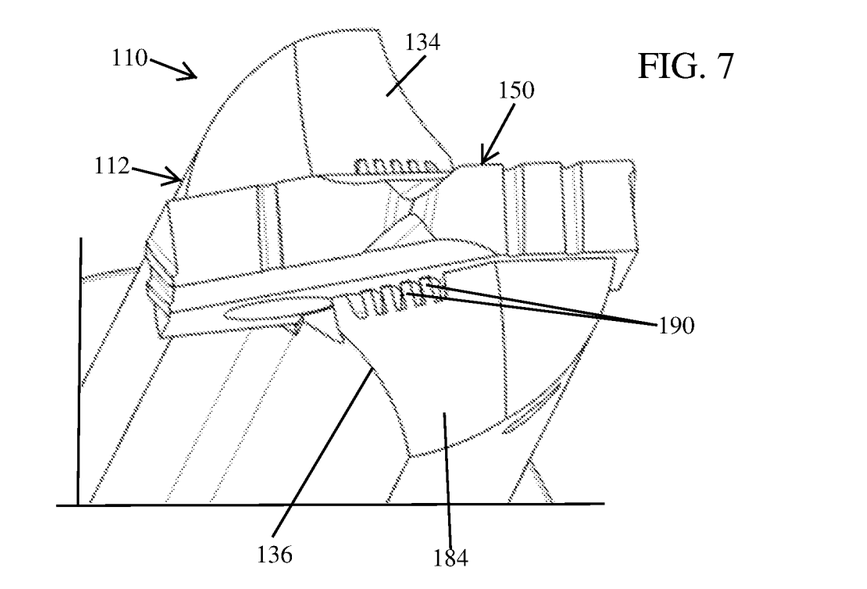
FIG. 7 is a partial perspective view of the holder of FIG. 6, with the insert of FIG. 2 mounted in association with the holder.
Figure 8:
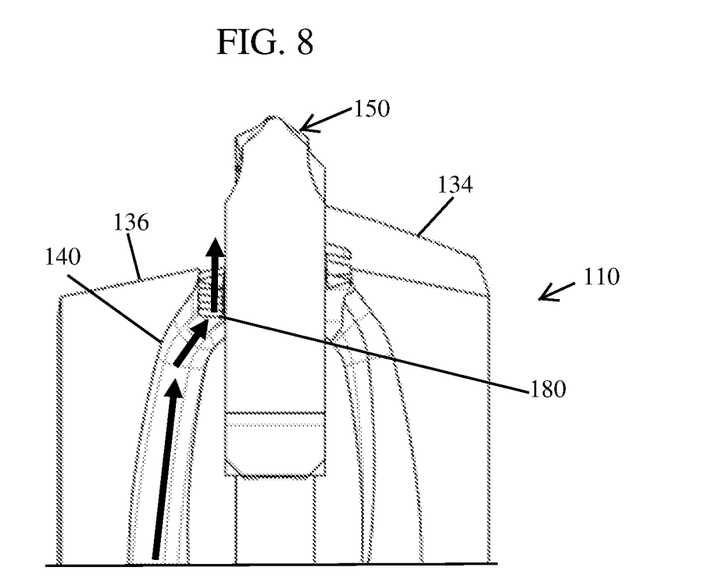
FIG. 8 is a partial sectional view of the holder shown in FIG. 6, with the insert of FIG. 2 mounted in association with the holder.

In this example, the arrangement of the first and second rake surface coolant supply vents 40 allow the application and flow of lubricating coolant directly to the rake face 54 adjacent the cutting edges 56 of the cutting insert 50, resulting in minimizing undesirable heat, friction, and adhesion to the rake face 54 of machined materials created by the cutting edges 56 in a tool assembly of this type. This allows higher penetration rates to be achieved in the drilling operation. The clamp arms 34 and 36 may optionally include further coolant outlets 48 provided on the top surface of the clamp arms 34 and 36 to provide additional coolant directed at the bottom of the hole to facilitate chip removal. In the machining operation, the cutting edges 56 deform and cut the material, generating significant heat and generating chips of material which must be removed from the rake surface and flushed from the hole. The first and second rake surface coolant supply vents 40 supply a powerful flow of lubricating coolant directly to the face of insert 50 at a position spaced from the rake face 54 adjacent the cutting edges 56 of the cutting insert 50. In this manner, the flow of coolant is dispersed into a curtain configuration that then impinges upon the interface between the chip of material being formed and the rake face 54. The metal material being plastically deformed by the cutting edges 54, produces mechanical and chemical processes at the fusion boundary of the formed chip which generate the heat. The flow of the curtain of coolant provided by the first and second rake surface coolant supply vents 40 serves to penetrate the fusion barrier more directly by causing flow of coolant onto the fusion boundary from an offset angle to the rake face and cutting edge interface, in a dispersed manner from impingement upon the side surface of insert 50 below the rake face 54 at 70. The flow of coolant from vents 40 also does not disrupt the flow of chips into flutes in holder 12 as they are formed and evacuated by the flutes or other areas. The position of vents 40 maintain a substantially uniform flow of coolant to the interface between rake face and chip being formed, by the flow of coolant in a curtain across rake face 54 from the offset position adjacent the center of the insert 50. The dispersal of impinging coolant across the rake face 54 extends to the outer diameter of the cutting edges 56. The distance from rake face 54 of the initial impingement depends on the size of the insert 50, but is generally spaced a distance of about 0.2 to 1 inch, at a position above the centerline of insert 50 height, but may be any suitable dimension based on the size of the insert 50. The vents 40 are angled relative to the sides of the insert 50 at an angle between 10 and 40 degrees for example, or any suitable angle based on the size of the insert 50 to produce the dispersion of coolant as shown in FIG. 5. For some applications, an angle of between 20 and 30 degrees has been found to be effective. The coolant holes 40 are also angled relative to the rotational axis of the insert at an angle between 10 and 40 degrees for example, with this angle being based on the width of the insert 50 to allow dispersion of the curtain of coolant from adjacent the position near the rotational axis of insert 50 and across the entire interface between the rake face and chip as its being formed during machining. For some applications, an angle of between 20 and 30 degrees has been found to be effective. The size and position of the coolant holes 40 at the interface between the clamp arms 34 and 36 and side of the insert 50 also enable the desired volume of coolant to be dispersed over the interface of rake face 54 and the fusion boundary of the formed chip at the cutting edges 56. The coolant may be supplied under pressures of 500 to 1000 psi for example, but other pressures may be suitable or preferred depending on the application and materials being machined. Thus, in operation, the chips formed along the cutting edges 56 from the center and along the rake face are curled by the cutting lip 55 on rake face 54 and chip splitter 66 which introduces stress, which is then impinged upon by the curtain of coolant supplied by first and second coolant vents 40 to shock the material as it is being deformed at the cutting edges 56 to aid in chip segmentation. The coolant from vents 40 fan across the insert face and into the rake face 54 to impinge upon the fusion boundary of the chip as it is formed, thermally shocking the material as the chip is formed at the rake surface interface.

Figure 4:
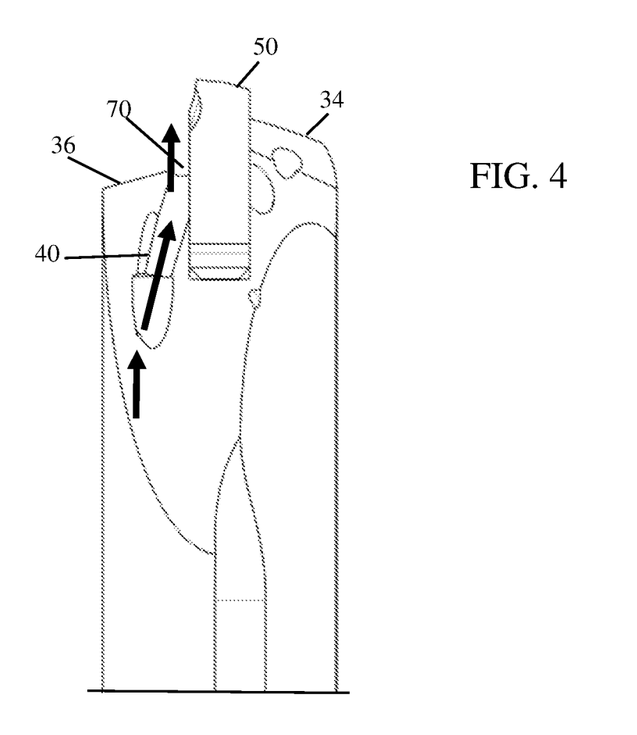
FIG. 4 is a partial sectional view of the holder shown in FIG. 1.

Also in this example, the configuration of the first and second coolant exit holes 40 to have a portion, such as about half the diameter as shown, at the interface of the clamp arms 34 and 36 and the sides of the insert 50, provides the desired dispersion of coolant along the entire rake face 54 to the outer diameter. The coolant outlets 40 form a partial coolant hole coming out on the slot 30, to direct coolant at the rake face and disperse the coolant across the rake face adjacent the cutting edges 56 where the chip of material is formed during machining, and directly at the fusion boundary of the chip being formed. The configuration of coolant holes 40 in combination with the slot 30 and interface with the side surface of insert 50 to provide partial outlets at the interface, causes turbulence and fringing of coolant out of the partial orifice to create larger coolant dispersion relative to diameter. This facilitates and creates the desired fan dispersion of coolant across the rake face 54. The half hole configuration of this example causes fringing left and right when exiting the orifice, and the reduced flow created at the interface causes turbulence at edges to increase the fringing effect. Though a single coolant outlet 40 provides the desired dispersion of coolant across the rake face 54, additional coolant holes or exits to cover the rake face may be used if desired, or other configurations of the partial outlets 40 may be used rather than half of a circular hole for example.

As will be described with reference to other examples, the insert 50 may also have coolant directing structures on the face of the insert to help direct flow of coolant to the rake face and forming chip. The flow of coolant along the rake face 54 also directly reaches the fusion boundary of the forming chip on the rake face 54. The curtain of coolant supplied to the rake face 54 further does not impede movement of chips as they are formed into the flute for evacuation, but instead helps curl and break the chip as it is formed at the rake face and coming off the rake face. The coolant is directed to this location from the location offset from the flute to flow flat across the face of insert 50 and rake face 54, so that formed chips flow over top of the coolant flow to get into the flute for effective discharge, even with large depth to diameter ratios. This arrangement also provides dispersal of coolant to the outside diameter of the rake face 54, while still getting dispersal at the center of the tool.

Figure 9:
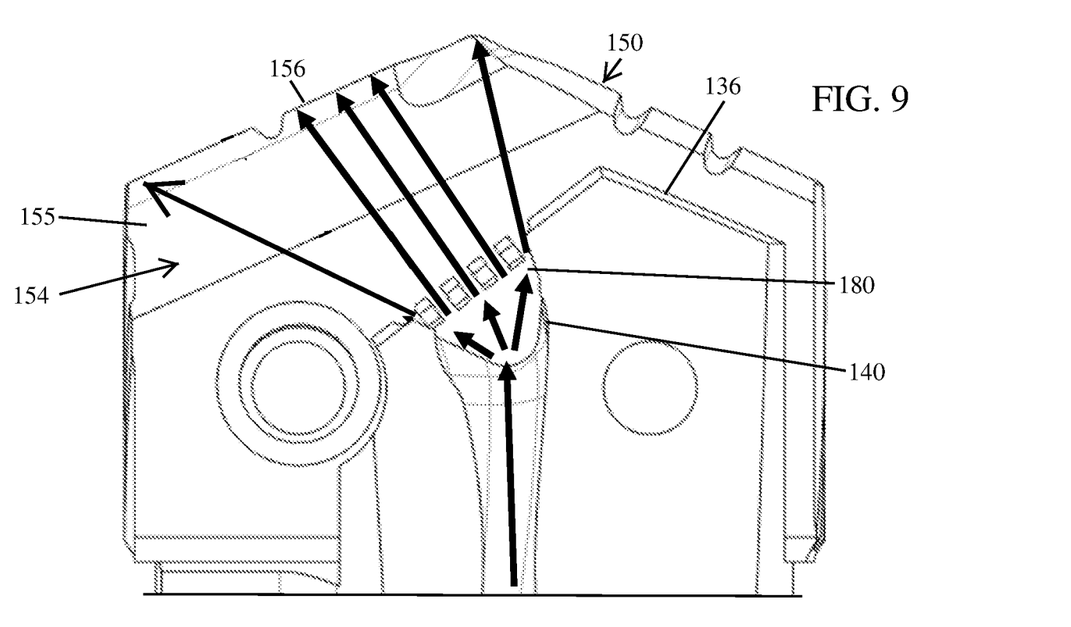
FIG. 9 is a partial sectional view of the holder shown in FIG. 6, with the insert of FIG. 2 mounted in association with the holder.

Turning to FIGS. 6-9, another example of the drilling system 110 invention is shown. In this example, the holder 112 may be configured similar to that described in the prior example, but includes additional structures at its first end 120. The clamping arms 134 and 136 include first and second rake surface coolant supply holes 140 which open into at least one chamber or pocket 180 formed adjacent the inside surface 182 of slot 130. The chamber 180 in this example is configured to have a somewhat triangular shape with the top side intersecting the interface between the side surface 182 and top surface 184 of arms 134 and 136, to create a partial opening at the interface. Other suitable shapes of chamber 180 are contemplated. In this example, the partial opening extends from approximately the center of the clamp arms 134 and 136 at 186 to a position adjacent the interior edge of clamp arms 134 and 136 at 188. In this manner, the coolant supplied through first and second rake surface coolant supply holes 140 exits into chamber 180, and then is dispersed from chamber 180 out the top of the chamber 180 and partial opening formed adjacent the side surface of a cutting insert 150 positioned in slot 130. This allows the application and flow of lubricating coolant directly to the rake face 154 and cutting lip 155 adjacent the cutting edges 156 of the cutting insert 150. This again results in minimizing undesirable heat, friction, and adhesion to the rake face 154 of machined materials created by the cutting edges 156, to allow higher penetration rates to be achieved. The partial opening formed adjacent the side surface of a cutting insert 150 created by chamber 180 may also include barrier structures 190 for preventing the possible ingress of material chips in chamber 180 during machining and/or to facilitate dispersing coolant from chamber 180 to be directed into the rake face 154 as desired. The structures 190 may have slanted sides to help direct the flow of coolant as desired. Though not shown, additional outlets may be provided on the top surface of the clamp arms 134 and 136 to provide additional coolant directed at the bottom of the hole if desired. Again in this example, the first and second rake surface coolant supply outlets 140 supply a powerful flow of lubricating coolant directly to the face of insert 150 at a position spaced from the rake face 154 adjacent the cutting edges 156 of the cutting insert 150. In this manner, the flow of coolant is dispersed into a curtain configuration that then impinges upon the interface between the chip of material being formed and the rake face 154. The flow of the curtain of coolant provided by the first and second rake surface coolant supply outlets 140 in conjunction with chamber 180 serves to disperse coolant more directly onto the fusion boundary from an offset angle to the rake face and cutting edge interface, as in the prior example. The flow of coolant from the partial openings created by chamber 180 again does not disrupt the flow of chips into the flutes of holder 112 as they are formed and evacuated by the flutes or other areas. The position of vents 140 and chambers 180 maintain a substantially uniform flow of coolant to the interface between rake face and chip being formed, creating a curtain of coolant across rake face 154 from the offset position from the flutes. The dispersal of impinging coolant across the rake face 154 extends to the outer diameter of the cutting edges 156. The distance from rake face 154 of the initial impingement depends on the size of the insert 150, but is spaced a distance to allow for desired dispersion of the coolant. The outlets 140 are angled relative to the sides of the insert 150 at an angle to produce the dispersion of coolant as shown in FIG. 9. In this example, the coolant holes 140 may be substantially parallel to the rotational axis of the insert, but chamber 180 then produces the dispersion of the coolant at an angle across the entire interface between the rake face and chip as its being formed during machining. Thus, in operation, as in the prior example, the chips formed along the cutting edges 156 from the center and along the rake face 154 are thermally shocked as the material is being deformed at the cutting edges 156 to aid in chip segmentation.

Figure 10:
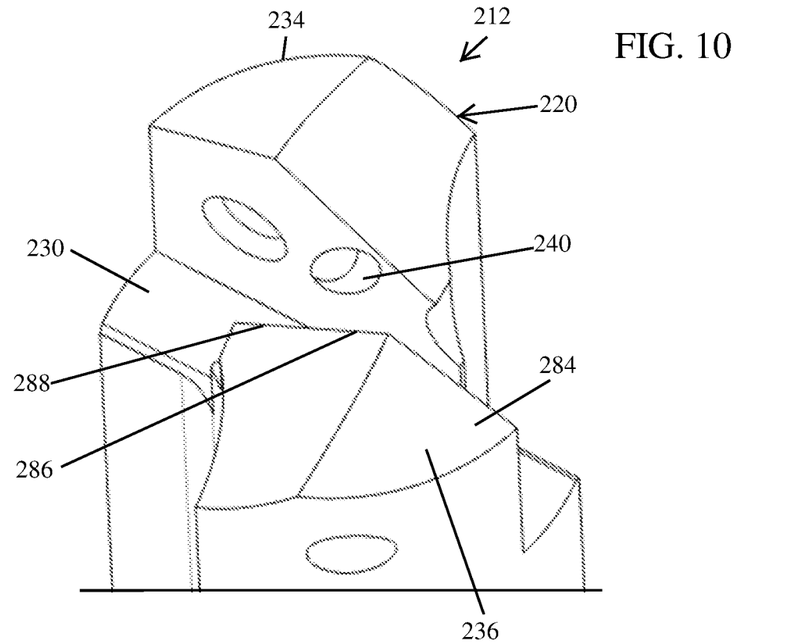
FIG. 10 is a partial perspective view of an alternative example of a holder in the drilling tool assembly of the invention.
Figure 11:
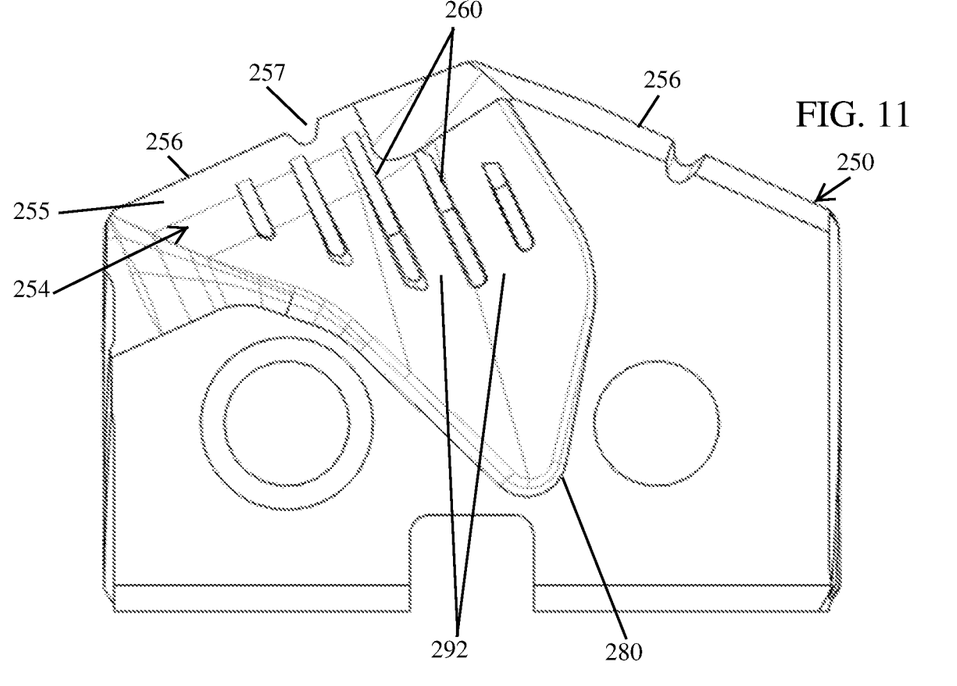
FIG. 11 is a view of an alternative example of a cutting insert in the drilling tool assembly of the invention.

In another example as shown in FIGS. 10-11, the holder 212 may be configured similar to that described in the prior example, but includes additional structures at its first end 220. The clamping arms 234 and 236 include first and second rake surface coolant supply holes 240 which open onto the inside surface 282 of slot 230. The outlets 240 exit into a chamber or pocket 280 formed on side surface of insert 250 in this example. The chamber 280 is configured to have a somewhat triangular shape with the top side opening into the top of insert 250, which intersects the interface between the side surface 282 and top surface 284 of arms 234 and 236, to create a partial opening at the interface. Other suitable shapes of chamber 280 are contemplated. In this example, the partial opening extends from approximately the center of the clamp arms 234 and 236 at 286 to a position adjacent the interior edge of clamp arms 234 and 236 at 288. In this manner, the coolant supplied through first and second rake surface coolant supply holes 240 exits into chamber 280, and then is dispersed from chamber 280 out the top of the chamber 280 and partial opening formed adjacent the side surface of a cutting insert 250 positioned in slot 230. This allows the application and flow of lubricating coolant directly to the rake face 254 and cutting lip 255 adjacent the cutting edges 256 of the cutting insert 250. This again results in minimizing undesirable heat, friction, and adhesion to the rake face 254 of machined materials created by the cutting edges 256, to allow higher penetration rates to be achieved. There may also be coolant flow diverting structures 290 formed adjacent the partial opening between the side surface of a cutting insert 250 created by chamber 280, to control flow of and dispersion of coolant across the entire rake face 254. The structures 290 may be upstanding off of the side surface of insert 250 and tapering down toward the rake face 254, but other suitable configurations, such as curved members or grooves may be used to control flow of coolant if desired. In the configuration shown, or other suitable configurations of structures 290, the structures 290 also serve as chip breakers, to facilitate the formation of chips as the material is curled by the cutting lip 255 and rake face 254. The replaceable cutting tip 250 is responsible for shearing material from the workpiece and chip-splitters create two or more chips formed along the rake face 254 further broken or segmented by the structures 290 serving as chip breakers. The chip breakers 290 curl the chip, introducing stress, ultimately aiding in chip segmentation. The coolant delivery system provides a coolant cavity 280, which helps fan and disperse the coolant to hit all cutting edges of the cutting tip 250. To further help with coolant distribution and aid chip formation, the structures 290 which serve as further chip breaker ridges also allow directing coolant directly into the chip breaking zone via coolant channels 292 formed between ridges 290. While other tools deliver coolant parallel to the tool axis, supplying coolant to the cutting tip by flooding the hole created by the tool, the purpose of this and other designs of the invention provide the ability to fan the coolant across the face of the insert, delivering it to the entire cutting edge.

Though not shown, additional outlets may be provided on the top surface of the clamp arms 234 and 236 to provide additional coolant directed at the bottom of the hole if desired. Again in this example, the first and second rake surface coolant supply outlets 240 supply a powerful flow of lubricating coolant directly to the chamber 280 formed in the face of insert 150 at a position spaced from the rake face 254. In this manner, the flow of coolant is dispersed into a curtain configuration that then impinges upon the interface between the chip of material being formed and the rake face 254. The flow of the curtain of coolant provided by the first and second rake surface coolant supply outlets 240 in conjunction with chamber 280 serves to disperse coolant more directly onto the fusion boundary from an offset angle to the rake face and cutting edge interface, as in the prior examples. The flow of coolant from the partial opening created by chamber 280 again does not disrupt the flow of chips into the flutes of holder 212 as they are formed and evacuated by the flutes or other areas. The position of vents 240 and chambers 280 maintain a substantially uniform flow of coolant to the interface between rake face and chip being formed, creating a curtain of coolant across rake face 254 from the offset position from the flutes. The dispersal of impinging coolant across the rake face 254 extends to the outer diameter of the cutting edges 256. The distance from rake face 254 of the initial impingement depends on the size of the insert 250, but is spaced a distance to allow for desired dispersion of the coolant. The outlets 240 are angled relative to the sides of the insert 250 at an angle to produce the dispersion of coolant as desired. In this example, the coolant holes 240 may be substantially parallel or angled to the rotational axis of the insert 250, which in conjunction with chamber 280 then produces the dispersion of the coolant as desired. Thus, in operation, as in the prior examples, the chips formed along the cutting edges 256 from the center and along the rake face 254 are thermally shocked as the material is being deformed at the cutting edges 256 to aid in chip segmentation.

Figure 12:
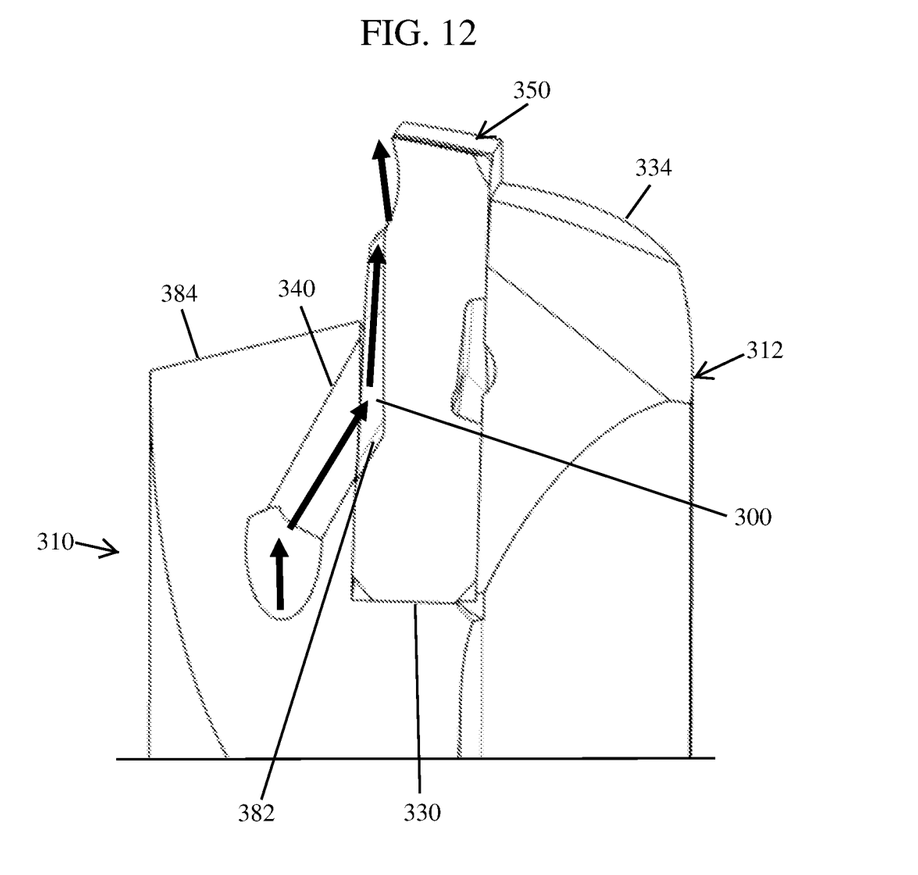
FIG. 12 is a partial sectional view of the holder shown in FIG. 10, with the insert of FIG. 11 mounted in association with the holder.
Figure 13:
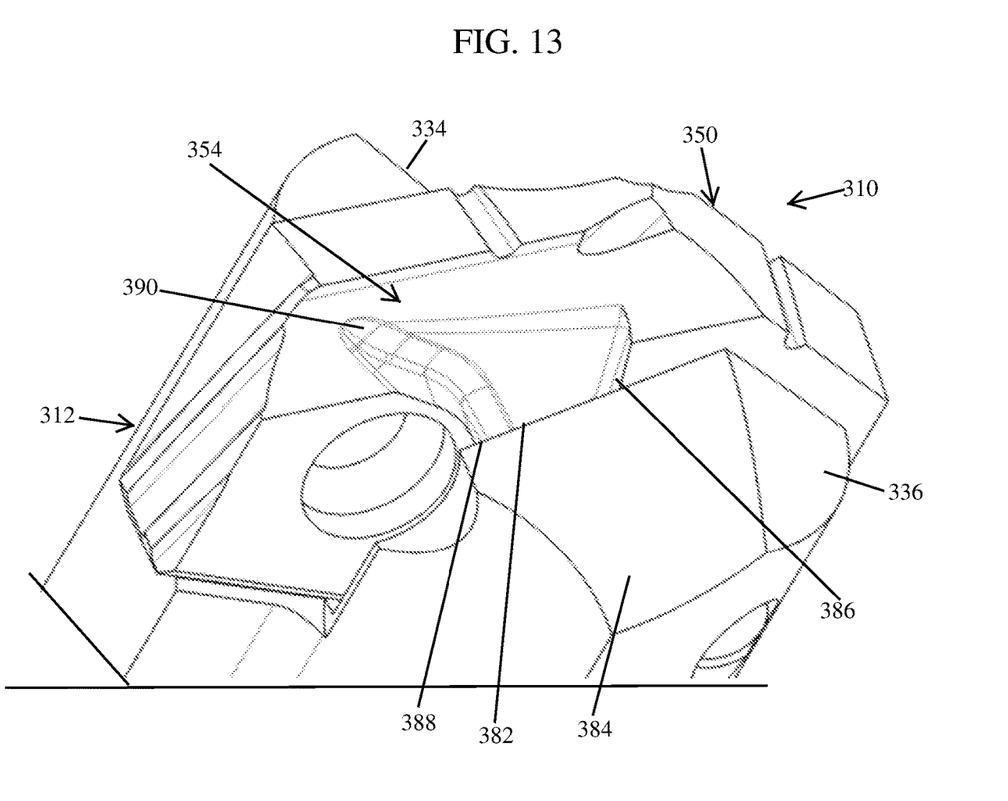
FIG. 13 is a partial perspective view of an alternative example of a holder and cutting insert in the drilling tool assembly of the invention.

A further example is shown in FIGS. 12-13, with system 310 including holder 312 that includes additional structures at its first end 320. The clamping arms 334 and 336 include first and second rake surface coolant supply holes 340 which open onto the inside surface 382 of slot 330. The outlets 340 exit into a chamber or pocket 380 formed on side surface of insert 350 in this example. The chamber 380 is configured to have a somewhat triangular shape with the top side opening toward the top of insert 350, which intersects the interface between the side surface 382 and top surface 384 of arms 334 and 336, to create a partial opening at the interface. The opening is wide and thin to cause dispersion of the coolant in a curtain as desired while preventing the ingress of chips or debris. Other suitable shapes of chamber 380 are contemplated. In this example, the partial opening extends from approximately the center of the clamp arms 334 and 336 at 386 to a position adjacent the interior edge of clamp arms 334 and 336 at 388. In this manner, the coolant supplied through first and second rake surface coolant supply holes 340 exits into chamber 380, and then is dispersed from chamber 380 out the top of the chamber and partial opening formed adjacent the side surface of a cutting insert 350. This allows the application and flow of lubricating coolant directly to the rake face 354 adjacent the cutting edges 356 of the cutting insert 350. In this example, the cutting edges 356 extend outwardly from the thickness of the insert body, and the flow of coolant directly impinges on the rake surface 354 and interface with the cutting edges 356 to shock and facilitate chip formation. This again results in minimizing undesirable heat, friction, and adhesion to the rake face 354 of machined materials created by the cutting edges 356, to allow higher penetration rates to be achieved. There may also be coolant flow diverting structures 390 on the side of insert 350 to facilitate directing flow of coolant across the entire rake face if desired, and/or in the chamber 380. The structures 390 may be one or more grooves in the side surface of insert 350, or other suitable configurations, to control flow of coolant if desired. Additional coolant holes on the top of clamp arms 334 and 336 may be used if desired. The partial opening between the side surface of a cutting insert 350 created by chamber 380, controls the flow of and dispersion of coolant across the entire rake face 354.

Figure 14:
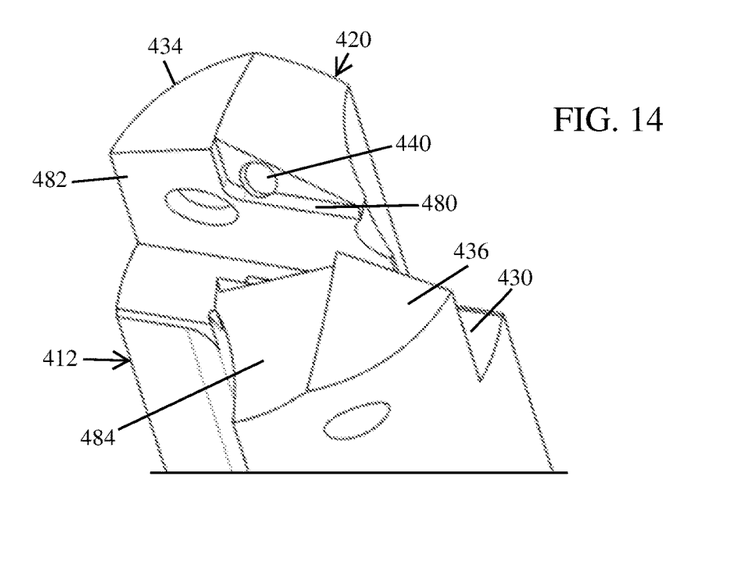
FIG. 14 is a partial perspective view of an alternative example of a holder in the drilling tool assembly of the invention.
Figure 15:
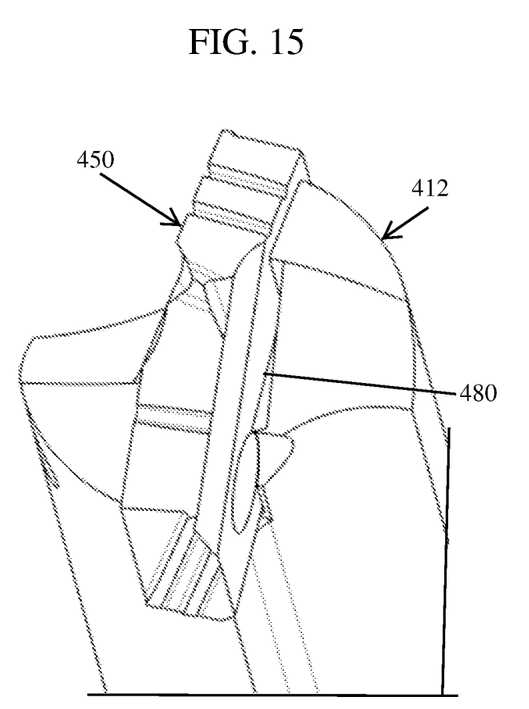
FIG. 15 is a partial perspective view of the example of FIG. 14 with a cutting insert mounted in the holder in the drilling tool assembly of the invention.

Turning to FIGS. 14-15, with the holder 412 that includes additional structures at its first end 420. The clamping arms 434 and 436 include first and second rake surface coolant supply holes 440 which open onto the inside surface 482 of slot 430. The outlets 440 exit into a chamber or pocket 480 machined into the side surface of clamp arms 440 adjacent the centerline of the tool for example. The chamber 480 is configured to have a somewhat triangular shape with the top side opening toward the top of clamp arms 434 and 436, which intersects the interface between the side surface 482 and top surface 484 of arms 434 and 436, to create a partial opening at the interface. The opening is wide and thin to cause dispersion of the coolant in a curtain as desired while preventing the ingress of chips or debris. Other suitable shapes of chamber 480 are contemplated. In this example, the partial opening extends from approximately the center of the clamp arms 434 and 436 to a position adjacent the interior edge of clamp arms 434 and 436. In this manner, the coolant supplied through first and second rake surface coolant supply holes 440 exits into chamber 480, and then is dispersed from chamber 480 out the top of the chamber and partial opening formed adjacent the side surface of a cutting insert mounted in slot 430. This allows the application and flow of lubricating coolant directly to the rake face adjacent the cutting edges of the cutting insert. There may also be coolant flow diverting structures formed on the side of the cutting insert to facilitate directing flow of coolant across the entire rake face if desired, and/or in the chamber 480. Additional coolant holes on the top of clamp arms 434 and 436 may be used if desired. The partial opening between the side surface of a cutting insert created by chamber 480, controls the flow of and dispersion of coolant across the entire rake face of a cutting insert.

Figure 16:
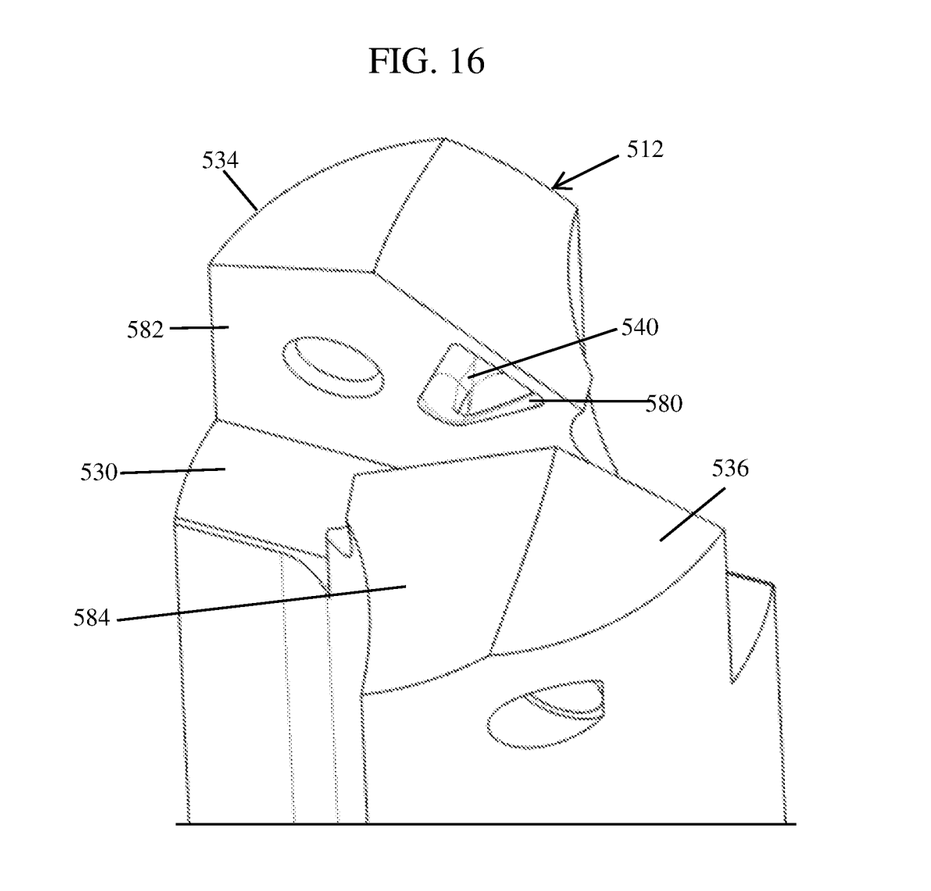
FIG. 16 is a partial perspective view of an alternative example of a holder in the drilling tool assembly of the invention.

Turning to FIG. 16, with the holder 512 that includes additional structures at its first end. The clamping arms 534 and 536 include first and second rake surface coolant supply holes 540 which open onto the inside surface 582 of slot 530. The outlets 540 exit into a chamber or pocket 580 formed by additive manufacturing techniques in association with the coolant channel and outlet 540, formed into the holder 512 and interior side portion of the clamp arms 534 and 536 for example. The chamber 580 and outlet 540 are configured to direct coolant out of the chamber 580 in a dispersed pattern to the entire rake face of a cutting insert positioned in slot 530. The top of chamber 580 opens toward the top of clamp arms 534 and 536, which intersects the interface between the side surface 582 and top surface 584 of arms 534 and 536, to create a partial opening at the interface. The opening is directed and thin to cause dispersion of the coolant in a curtain as desired while preventing the ingress of chips or debris. Other suitable shapes of chamber 580 are contemplated. The additive manufacturing or molding techniques allow the outlet 540 to be directed in a manner to be dispersed along the entire rake face of a cutting edge as desired. Other coolant flow diverting structures formed in association with outlet 540 or chamber 580 may be used and/or on an insert positioned in holder 512. Additional coolant holes on the top of clamp arms 534 and 536 may be used if desired. The directed outlet 540 and partial opening between the side surface of a cutting insert created by chamber 580, controls the flow of and dispersion of coolant across the entire rake face of a cutting insert as desired.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition or step being referred to is an optional (i.e., not required) feature of the embodiments.

While this invention has been described with reference to embodiments thereof, it shall be understood that such description is by way of illustration only and should not be construed as limiting the scope of the claimed embodiments. Accordingly, the scope and content of the embodiments are to be defined only by the terms of the following claims. Furthermore, it is understood that the features of any embodiment discussed herein may be combined with one or more features of any one or more embodiments otherwise discussed or contemplated herein unless otherwise stated.

What is claimed is:

1. A drilling system comprising,
    a holder having a rotational axis and first and second clamp arms with side surfaces forming a mounting slot,
    a cutting insert with sides positioned adjacent the side surfaces of the mounting slot and cutting edges extending from the rotational axis and rake surfaces adjacent the cutting edges positioned above the first and second clamp arms when the insert is mounted in the mounting slot,
    wherein the holder comprises at least one coolant hole disposed through the first and second clamp arms oriented at an angle to one of the sides of the insert with a coolant outlet from the coolant hole at a position below the rake surfaces of the insert, wherein coolant is dispersed across the entire rake face of each cutting edge after impinging on the side of the insert from the coolant outlet, wherein the coolant outlet is a partial opening at the top edge of the side surfaces of the slot formed in the first and second clamp arms.

2. The drilling system of claim 1, wherein the holder comprises at least one coolant hole disposed through the first and second clamp arms with a coolant outlet substantially at the intersection of the top edge of the side surfaces of the slot formed in the first and second clamp arms with the side of the insert at a position below the rake surfaces of the insert.

3. The drilling system of claim 1, wherein the holder has flutes adjacent to the first and second clamp arms for evacuation of chips formed by the cutting edges of the insert and the coolant outlet is positioned adjacent to the flute.

4. The drilling system of claim 1, wherein the top edge of the side surfaces of the slot formed in the first and second clamp arms below the rake faces is angled from a top to a bottom and the coolant outlet is positioned adjacent the bottom.

5. The drilling system of claim 1, wherein the coolant outlet is formed over only a portion of the extent of the top of the side surface of the mounting slot in the first and second clamp arms below the rake surfaces.

6. A drilling system comprising,
    a holder having a rotational axis and first and second clamp arms with side surfaces forming a mounting slot,
    a cutting insert with sides positioned adjacent the side surfaces of the mounting slot and cutting edges extending from the rotational axis and rake surfaces adjacent the cutting edges positioned above the first and second clamp arms when the insert is mounted in the mounting slot,
    wherein the holder comprises at least one coolant hole disposed through the first and second clamp arms oriented at an angle to one of the sides of the insert with a coolant outlet from the coolant hole at a position below the rake surfaces of the insert, wherein coolant is dispersed across the entire rake face of each cutting edge after impinging on the side of the insert from the coolant outlet, wherein the holder has flutes adjacent to the first and second clamp arms for evacuation of chips formed by the cutting edges of the insert and the coolant outlet is positioned adjacent to the flute.

7. The drilling system of claim 6, wherein the holder comprises at least one coolant hole disposed through the first and second clamp arms with a coolant outlet substantially at the intersection of the top edge of the side surfaces of the slot formed in the first and second clamp arms with the side of the insert at a position below the rake surfaces of the insert.

8. The drilling system of claim 6, wherein the coolant outlet is a partial opening at the top edge of the side surfaces of the slot formed in the first and second clamp arms.

9. The drilling system of claim 6, wherein the top edge of the side surfaces of the slot formed in the first and second clamp arms below the rake faces is angled from a top to a bottom and the coolant outlet is positioned adjacent the bottom.

10. The drilling system of claim 6, wherein the coolant outlet is formed over only a portion of the extent of the top of the side surface of the mounting slot in the first and second clamp arms below the rake surfaces.

11. A drilling system comprising,
    a holder having a rotational axis and first and second clamp arms with side surfaces forming a mounting slot, a cutting insert with sides positioned adjacent the side surfaces of the mounting slot and cutting edges extending from the rotational axis and rake surfaces adjacent the cutting edges positioned above the first and second clamp arms when the insert is mounted in the mounting slot, wherein the holder comprises at least one coolant hole disposed through the first and second clamp arms oriented at an angle to one of the sides of the insert with a coolant outlet from the coolant hole at a position below the rake surfaces of the insert, wherein coolant is dispersed across the entire rake face of each cutting edge after impinging on the side of the insert from the coolant outlet, wherein the top edge of the side surfaces of the slot formed in the first and second clamp arms below the rake faces is angled from a top to a bottom and the coolant outlet is positioned adjacent the bottom.

12. The drilling system of claim 11, wherein the holder comprises at least one coolant hole disposed through the first and second clamp arms with a coolant outlet substantially at the intersection of the top edge of the side surfaces of the slot formed in the first and second clamp arms with the side of the insert at a position below the rake surfaces of the insert.

13. The drilling system of claim 11, wherein the coolant outlet is a partial opening at the top edge of the side surfaces of the slot formed in the first and second clamp arms.

14. The drilling system of claim 11, wherein the top edge of the side surfaces of the slot formed in the first and second clamp arms below the rake faces is angled from a top to a bottom and the coolant outlet is positioned adjacent the bottom.

15. The drilling system of claim 11, wherein the coolant outlet is formed over only a portion of the extent of the top of the side surface of the mounting slot in the first and second clamp arms below the rake surfaces.

16. A drilling system comprising a holder having a rotational axis and first and second clamp arms with side surfaces forming a mounting slot,
a cutting insert with sides positioned adjacent the side surfaces of the mounting slot and cutting edges extending from the rotational axis and rake surfaces adjacent the cutting edges positioned above the first and second clamp arms when the insert is mounted in the mounting slot, wherein the holder comprises at least one coolant hole disposed through the first and second clamp arms with a coolant outlet from the coolant hole at a position below the rake surfaces of the insert, with the coolant hole directed at the sides of the insert at a position below the rake surfaces to disperse coolant across the entire rake face of each cutting edge, and wherein at least one opening is created at the top of the first and second clamp arms by at least one chamber in association with the insert and the side surface of the first and second clamp arms in the mounting slot.

17. The drilling system of claim 16, wherein the at least one opening has barrier structures at the top region of the first and second clamp arms.

18. The drilling system of claim 16, wherein the at least one chamber has coolant diverting structures arranged relative to the coolant outlet.

19. The drilling system of claim 16, wherein the at least one chamber is formed in a triangular shape with a top side intersecting the top of the side surface of the first and second clamp arms.

20. The drilling system of claim 16, wherein the coolant outlet is positioned adjacent the bottom of the at least one chamber.

21. The drilling system of claim 16, wherein at least one coolant channel is directed at an angle into the at least one chamber.

22. The drilling system of claim 16, wherein the at least one chamber is formed in the side surfaces of the insert and/or in the side surfaces of the mounting slot.

23. A drilling system comprising,
a holder having a rotational axis and first and second clamp arms with side surfaces forming a mounting slot,
a cutting insert with sides positioned adjacent the side surfaces of the mounting slot and cutting edges extending from the rotational axis and rake surfaces adjacent the cutting edges positioned above the first and second clamp arms when the insert is mounted in the mounting slot,
wherein the holder comprises at least one coolant hole disposed through the first and second clamp arms oriented at an angle to one of the sides of the insert with a coolant outlet from the coolant hole at a position below the rake surfaces of the insert, wherein coolant is dispersed across the entire rake face of each cutting edge after impinging on the side of the insert from the coolant outlet, wherein the coolant outlet is formed over only a portion of the extent of the top of the side surface of the mounting slot in the first and second clamp arms below the rake surfaces.

24. The drilling system of claim 23, wherein the holder comprises at least one coolant hole disposed through the first and second clamp arms with a coolant outlet substantially at the intersection of the top edge of the side surfaces of the slot formed in the first and second clamp arms with the side of the insert at a position below the rake surfaces of the insert.

25. The drilling system of claim 23, wherein the coolant outlet is a partial opening at the top edge of the side surfaces of the slot formed in the first and second clamp arms.

26. The drilling system of claim 23, wherein the holder has flutes adjacent to the first and second clamp arms for evacuation of chips formed by the cutting edges of the insert and the coolant outlet is positioned adjacent to the flute.

27. The drilling system of claim 23, wherein the top edge of the side surfaces of the slot formed in the first and second clamp arms below the rake faces is angled from a top to a bottom and the coolant outlet is positioned adjacent the bottom.

28. A method of delivering coolant in a drilling operation using a drilling tool comprising a holder having first and second ends and a rotational axis, with the second end of the holder configured to be fixedly attached in a drilling machine, and the first end of the holder comprising a mounting slot with side surfaces and a cutting insert positioned in the mounting slot with side surfaces positioned adjacent the side surfaces of the mounting slot, and wherein the insert includes first and second cutting edges extending from the rotational axis, and first and second rake faces adjacent the cutting edges and above the mounting slot of the holder, and wherein the holder further includes at least one coolant hole disposed through the first and second clamp arms oriented at an angle to one of the sides of the insert with a coolant outlet from the coolant hole at a position below the rake surfaces of the insert, wherein the top edge of the side surfaces of the slot formed in the first and second clamp arms below the rake faces is angled from a top to a bottom and the coolant outlet is positioned adjacent the bottom.

29. A drilling system comprising,
a holder having a rotational axis and first and second clamp arms with a mounting slot having side surfaces, a cutting insert with sides positioned adjacent the side surfaces of the mounting slot and cutting edges extending from the rotational axis and rake surfaces adjacent the cutting edges positioned above the first and second clamp arms when the insert is mounted in the mounting slot, wherein the holder comprises at least one coolant hole disposed through the first and second clamp arms with a coolant outlet substantially at the intersection of the top edge of the side surfaces of the slot formed in the first and second clamp arms with the side of the insert at a position below the rake surfaces of the insert, wherein coolant is dispersed from the coolant hole through the coolant outlet directly onto the side of the insert and across the entire rake face of each cutting edge after impinging on the side of the of the insert.

30. The drilling system of claim 29, wherein the coolant outlet is a partial opening at the top edge of the side surfaces of the slot formed in the first and second clamp arms.

31. The drilling system of claim 29, wherein the holder has flutes adjacent to the first and second clamp arms for evacuation of chips formed by the cutting edges of the insert and the coolant outlet is positioned adjacent to the flute.

32. The drilling system of claim 29, wherein the top edge of the side surfaces of the slot formed in the first and second clamp arms below the rake faces is angled from a top to a bottom and the coolant outlet is positioned adjacent the bottom.

33. The drilling system of claim 29, wherein the top edge of the side surfaces of the slot formed in the first and second clamp arms below the rake faces is angled from a top to a bottom and the coolant outlet is positioned adjacent the bottom.

34. The drilling system of claim 29, wherein the coolant outlet is formed over only a portion of the extent of the top of the side surface of the mounting slot in the first and second clamp arms below the rake surfaces.

* * * * *